(12) United States Patent
Hand et al.

(10) Patent No.: US 10,711,853 B2
(45) Date of Patent: Jul. 14, 2020

(54) OVERRUNNING COUPLING AND CONTROL ASSEMBLY, COUPLING ASSEMBLY AND LOCKING MEMBER FOR USE THEREIN HAVING IMPROVED DYNAMICS WITH REGARDS TO LOCKING MEMBER LAYDOWN SPEED

(71) Applicant: MEANS INDUSTRIES, INC., Saginaw, MI (US)

(72) Inventors: Joshua D. Hand, Midland, MI (US); Earl A. Getchel, Saginaw, MI (US); Terry O. Hendrick, Cass City, MI (US)

(73) Assignee: Means Industries, Inc., Saginaw, MI (US)

( * ) Notice: Subject to any disclaimer, the term of this patent is extended or adjusted under 35 U.S.C. 154(b) by 150 days.

(21) Appl. No.: 15/889,324

(22) Filed: Feb. 6, 2018

(65) Prior Publication Data
US 2018/0328419 A1 Nov. 15, 2018

Related U.S. Application Data

(60) Provisional application No. 62/506,243, filed on May 15, 2017.

(51) Int. Cl.
*F16D 41/12* (2006.01)
*F16D 41/14* (2006.01)

(52) U.S. Cl.
CPC .......... *F16D 41/125* (2013.01); *F16D 41/14* (2013.01)

(58) Field of Classification Search
CPC .............................. F16D 41/125; F16D 41/14
See application file for complete search history.

(56) References Cited

U.S. PATENT DOCUMENTS

| 4,050,560 | A | 9/1977 | Torstenfelt |
| 5,070,978 | A | 12/1991 | Pires |
| 5,362,293 | A | 11/1994 | Romanauskas |
| 5,449,057 | A | 9/1995 | Frank |
| 5,597,057 | A | 1/1997 | Ruth et al. |
| 5,638,929 | A | 6/1997 | Park |
| 5,678,668 | A | 10/1997 | Sink |
| 5,918,715 | A | 7/1999 | Ruth et al. |
| 5,927,455 | A | 7/1999 | Baker et al. |
| 5,964,331 | A | 10/1999 | Reed et al. |

(Continued)

OTHER PUBLICATIONS

International Searching Authority, International Search Report and the Written Opinion for International Application No. PCT/US2018/32650, dated Aug. 8, 2018.

(Continued)

*Primary Examiner* — David R Morris
(74) *Attorney, Agent, or Firm* — Brooks Kushman P.C.

(57) ABSTRACT

Overrunning coupling and control assembly, coupling assembly and locking member having at least one side surface with a draft to improve locking member dynamics are provided. Locking member dynamics is improved with regards to locking member laydown speed. Laydown speed variation cause by a variable frictional coefficient between a pocket surface of a pocket in which the locking member is received and nominally retained and the at least one side surface of the locking member is minimized as well.

27 Claims, 13 Drawing Sheets

(56) References Cited

U.S. PATENT DOCUMENTS

| | | | |
|---|---|---|---|
| 6,065,576 A * | 5/2000 | Shaw | F16D 41/125 |
| | | | 192/45.1 |
| 6,116,394 A | 9/2000 | Ruth | |
| 6,129,190 A * | 10/2000 | Reed | F16D 41/12 |
| | | | 192/113.32 |
| 6,186,299 B1 | 2/2001 | Ruth | |
| 6,193,038 B1 | 2/2001 | Scott et al. | |
| 6,244,965 B1 | 6/2001 | Klecker et al. | |
| 6,290,044 B1 | 9/2001 | Burgman et al. | |
| 6,503,167 B1 | 1/2003 | Sturm | |
| 6,571,926 B2 | 6/2003 | Pawley | |
| RE38,498 E * | 4/2004 | Ruth | F16D 41/125 |
| | | | 188/82.8 |
| 6,814,201 B2 | 11/2004 | Thomas | |
| 6,953,409 B2 | 10/2005 | Schmidt et al. | |
| 7,093,512 B2 | 8/2006 | Ibamoto et al. | |
| 7,100,756 B2 | 9/2006 | Kimes et al. | |
| 7,198,587 B2 | 4/2007 | Samie et al. | |
| 7,223,198 B2 | 5/2007 | Kirnes et al. | |
| 7,256,510 B2 | 8/2007 | Holmes et al. | |
| 7,258,214 B2 | 8/2007 | Pawley et al. | |
| 7,275,628 B2 | 10/2007 | Pawley et al. | |
| 7,344,010 B2 | 3/2008 | Fetting, Jr. et al. | |
| 7,349,010 B2 | 3/2008 | Bryant et al. | |
| 7,464,801 B2 | 12/2008 | Wittkopp | |
| 7,484,605 B2 | 2/2009 | Pawley et al. | |
| 7,491,151 B2 | 2/2009 | Maguire et al. | |
| 7,743,678 B2 | 6/2010 | Wittkopp et al. | |
| 7,824,292 B2 | 11/2010 | Samie et al. | |
| 7,942,781 B2 | 5/2011 | Kimes | |
| 7,992,695 B2 | 8/2011 | Wittkopp et al. | |
| 8,011,464 B2 | 9/2011 | Samie et al. | |
| 8,042,669 B2 | 10/2011 | Samie et al. | |
| 8,042,670 B2 | 10/2011 | Bartos et al. | |
| 8,051,959 B2 | 11/2011 | Eisengruber | |
| 8,056,690 B2 | 11/2011 | Samie et al. | |
| 8,061,496 B2 | 11/2011 | Samie et al. | |
| 8,079,453 B2 | 12/2011 | Kimes | |
| 8,083,042 B2 | 12/2011 | Samie et al. | |
| 8,087,502 B2 | 1/2012 | Samie et al. | |
| 9,121,454 B2 | 9/2015 | Pawley | |
| 2005/0279602 A1 | 12/2005 | Ruth | |
| 2006/0124425 A1 * | 6/2006 | Fetting, Jr. | F16D 41/125 |
| | | | 192/48.3 |
| 2006/0185957 A1 | 8/2006 | Kimes et al. | |
| 2006/0249345 A1 * | 11/2006 | Ruth | F16D 41/125 |
| | | | 192/46 |
| 2008/0110715 A1 | 5/2008 | Pawley | |
| 2008/0169166 A1 | 7/2008 | Wittkopp et al. | |
| 2008/0185253 A1 | 8/2008 | Kimes | |
| 2008/0223681 A1 | 9/2008 | Stevenson et al. | |
| 2009/0098970 A1 | 4/2009 | Kimes | |
| 2009/0194381 A1 | 8/2009 | Samie et al. | |
| 2010/0063693 A1 | 3/2010 | Lee et al. | |
| 2010/0200358 A1 | 8/2010 | Eisengruber et al. | |
| 2010/0230226 A1 | 9/2010 | Prout | |
| 2010/0252384 A1 | 10/2010 | Eisengruber | |
| 2011/0183806 A1 | 7/2011 | Wittkopp et al. | |
| 2011/0214962 A1 | 9/2011 | Shaw et al. | |
| 2011/0233026 A1 | 9/2011 | Pawley | |
| 2011/0297500 A1 | 12/2011 | Shaw et al. | |
| 2014/0102848 A1 | 4/2014 | Pawley | |

OTHER PUBLICATIONS

The International Bureau of WIPO, International Preliminary Report on Patentability for International Application No. PCT/US2018/032650 dated Nov. 19, 2019.

* cited by examiner

OVERRUNNING COUPLING AND CONTROL ASSEMBLY, COUPLING ASSEMBLY AND LOCKING MEMBER FOR USE THEREIN HAVING IMPROVED DYNAMICS WITH REGARDS TO LOCKING MEMBER LAYDOWN SPEED

CROSS REFERENCE TO RELATED APPLICATION

This application claims the benefit of U.S. provisional patent application Ser. No. 62/506,243 filed May 15, 2017.

TECHNICAL FIELD

At least one embodiment of the present invention relates to overrunning coupling and control assemblies, coupling assemblies and locking members for use therein having improved dynamics with regards to locking member laydown speed.

Overview

As described in U.S. Pat. No. 6,571,926 entitled "One-Way Clutch Assembly Featuring Improved Strut Stability" and assigned to the assignee of the present application, clutches are used in a wide variety of applications to selectively couple power from a first rotatable "driving" member, such as a driving disk or plate, to a second, independently-rotatable "driven" member, such as a driven plate or disk. In one known variety of clutches, commonly referred to as "one-way" or "overrunning" clutches, the clutch "engages" to mechanically couple the driving member to the driven member only when the driving member seeks to rotate in a first direction relative to the driven member. Once so engaged, the clutch will release or decouple the driven member from the driving member only when the driving member rotates in a second, opposite direction relative to the driven member. Further, the clutch otherwise permits the driving member to freely rotate in the second direction relative to the driven member. Such "freewheeling" of the driving member in the second direction relative to the driven member is also known as the "overrunning" condition.

One such known one-way clutch employs juxtaposed, nominally-coaxial driving and driven members featuring generally planar clutch faces in closely-spaced axial opposition. Such "planar" one-way clutches, as taught by Frank in U.S. Pat. No. 5,449,057 and Ruth et al. in U.S. Pat. No. 5,597,057, typically include a plurality of recesses formed in the face of the driving member and at least as many recesses formed in the face of the driven member. A thin, flat strut is carried within each of the driving member's pockets such that a first longitudinal end of each strut may readily engage and bear against a shoulder defined by its respective recess of the driving member. The strut's second, opposite longitudinal end is urged toward and against the face of the driven member, for example, by a spring positioned beneath the strut in the recess of the driving member.

When the driving member rotates in the first direction relative to the driven member, the second end of at least one strut engages and thereafter bears against a shoulder defined by a recess of the driven member, whereupon the strut is placed in compression and the driven member is coupled for rotation with the driving member. When the driving member rotates in the second direction relative to the driven member, ramped surfaces defined by other portions of the driven member's recesses urge the second end of each strut back towards the driving member, whereupon the driving member is permitted to freely rotate in the second direction relative to the driven member.

This periodic engagement of the second end of each strut with the ramped surfaces of the driven member's clutch face during clutch overrun may generate a noise or "ratcheting" sound that is often associated with one-way clutches. Known approaches to reduce this ratcheting sound during clutch overrun include modifications to the design of the strut, including reductions in the strut's inertial mass; modifying the spring forces exerted on the strut; and the use of various motion-damping fluid in the space between the clutch faces to thereby better control the dynamics of the strut during clutch overrun. However, further improvement in noise reduction during overrun is desirable, particularly as other clutch components, such as the driven member, become fabricated from materials exhibiting different noise-transmissive characteristics, for example, powdered metal.

"Strut instability" is an unfavorable state often characterized by a strut that is extended when it should be seated in its pocket. Strut instability is a primary concern in terms of durability as it directly correlates to premature spring, strut and pocket wear and eventual failure. It is advantageous during the overrun phase that the struts descend into their respective pockets to minimize parasitic loses due to various Newtonian interactions. The minimum angular velocity of the pocket plate which keeps the strut confined to the pocket is often referred to as the strut "laydown" speed.

The mechanics effecting the descent of the strut are numerous and can be correlated to (among many other factors) rotational velocity of the pocket plate, angular acceleration of the pocket plate, strut geometry, spring coefficient, fluid interactions and pocket wall draft angle.

As previously mentioned, the draft angle of the outer pocket wall can also significantly affect the strut laydown speed. Angles above zero degrees tend to increase the laydown speed, while negative angles can be used to decrease the laydown speed. However, this presents the trade-off of manufacturing complexity, higher draft angles generally represent lower manufacturing costs as they can increase the life of the press used to produce the pocket plate. Whereas zero or negative draft angles are more difficult to produce, and usually require a secondary machining operation.

U.S. published application No. 2011/0297500 (also assigned to the assignee of the present application) provides a dynamic engagement analysis of a strut within its respective pocket wherein various forces acting upon the strut are illustrated and described as follows:

$F_R$=Resultant Strut Force. The force available to push the strut out of its pocket (i.e. resultant force on the strut).

$F_S$=Spring Force. The force created by a spring used to push the strut out of its pocket for engagement with the notch plate.

$F_C$=Centrifugal Force. The effective weight of the strut due to rotation of the pocket plate during operation. (Force of strut against pocket plate wall). This is a fictitious force dependent on the frame of reference of the observer.

$F_F$=Friction Force. This force is created by the effective weight of the strut (centrifugal force) acting on the pocket plate. The higher the rotational speed the larger the friction force. This force prevents the strut from pushing out of its pocket.

$F_P$=Strut Pushout Force. The angle of the pocket plate wall causes the strut to push out of the pocket plate. This is due to the centrifugal forces created by the rotation of the pocket plate.

$F_L$=Fluid Force. This force is created by the effect of the strut displacing transmission fluid when engaging into the notch plate.

As described in the above-noted application, a "truly vertical" or "slightly negative" vertical wall improves the stability of a strut or rocker (i.e. collectively referred to as "locking members") which experiences rotational centrifugal forces during overrun. Also, the "slightly negative" angle lowers the rpm even further at which a strut "locks down" due to such centrifugal forces.

In other words, performance is improved when a pocket plate wall is machined vertical or slightly negative versus a cast, positively angled, surface which may have a draft such as 1-2 degrees or 0.5-1 degrees (i.e. the surface is angled "slightly positive").

U.S. Pat. No. 5,927,455 discloses a bi-directional overrunning pawl-type clutch. U.S. Pat. No. 6,244,965 discloses a planar overrunning coupling for transfer of torque. U.S. Pat. No. 6,290,044 discloses a selectable one-way clutch assembly for use in an automatic transmission. U.S. Pat. Nos. 7,258,214 and 7,484,605 disclose an overrunning coupling assembly. U.S. Pat. No. 7,344,010 discloses an overrunning coupling assembly. U.S. Pat. No. 7,484,605 discloses an overrunning radial coupling assembly or clutch.

Other related U.S. Patent Publications include: 2011/0183806; 2011/0233026; 2011/0214962; 2010/0252384; 2010/0230226; 2010/0063693; 2010/0200358; 2009/0098970; 2009/0194381; 2008/0223681; 2008/0110715; 2008/0169166; 2008/0185253; 2006/0185957; and the following U.S. Pat. Nos. 7,942,781; 8,079,453; 7,992,695; 8,051,959; 8,011,464; 8,042,669; 8,061,496; 8,042,670; 8,056,690; 8,083,042; 8,087,502; 7,824,292; 7,743,678; 7,491,151; 7,464,801; 7,349,010; 7,275,628; 7,256,510; 7,223,198; 7,198,587; 7,100,756; 7,093,512; 6,953,409; 6,814,201; 6,503,167; 6,193,038; 6,116,394; 6,186,299; 6,571,926; 4,050,560; 5,638,929; 5,362,293; 5,678,668; 5,918,715; 5,070,978 and 5,964,331.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

A "moment of force" (often just moment) is the tendency of a force to twist or rotate an object. A moment is valued mathematically as the product of the force and a moment arm. The moment arm is the perpendicular distance from the point or axis of rotation to the line of action of the force. The moment may be thought of as a measure of the tendency of the force to cause rotation about an imaginary axis through a point.

In other words, a "moment of force" is the turning effect of a force about a given point or axis measured by the product of the force and the perpendicular distance of the point from the line of action of the force. Generally, clockwise moments are called "positive" and counterclockwise moments are called "negative" moments. If an object is balanced then the sum of the clockwise moments about a pivot is equal to the sum of the counterclockwise moments about the same pivot or axis.

FIG. 1 is a top plan view of a prior art locking member or strut, generally indicated at 10, received and nominally retained within a pocket 12 of a coupling face 14 of a coupling member, generally indicated at 16, such as a pocket plate. At high rotational speeds, such as 2000 RPM and above, the strut 10 locks itself against outer walls 18 of the pocket 12 due to centrifugal frictional affects as reactive forces, $F_{R1}$ and $F_{R2}$ which are spaced a relatively large distance from an engagement rotational axis 20 of the strut 10. Consequently, the overall movement that has to be overcome to engage and disengage the strut 10 with respect to a second coupling member (not shown in FIG. 1, but shown in many of the other Figures) such as a notch plate is quite large.

FIG. 2 illustrates a locking member or strut, generally indicated at 22, which transmits torque between first and second clutch or coupling members. As described in U.S. Pat. No. 9,121,454, the first coupling member 24 may be a pocket plate which can rotate in either a clockwise direction or a counter-clock-wise direction (as indicated at 29) about the rotational axis (not shown) of the assembly and includes a generally flat, annular coupling face 30 having a plurality of pockets, generally indicated at 32, each one of which is sized and shaped to receive and nominally retain a locking member such as the locking member 22. The pockets 32 are spaced about the axis of the assembly 28. The face is oriented to face axially in a first direction along the rotational axis of the assembly.

The second clutch member (not shown) may be a notch plate and has a generally flat, annular coupling second face opposed to the first face 30 and oriented to face axially in a second direction opposite the first direction along the rotational axis of the assembly. The second face has a plurality of locking formations that are engaged by the locking members 22 upon projection from the pockets 32 to prevent relative rotation of the first and second members with respect to each other in at least one direction about the axis of the assembly.

The locking member 22 includes a member-engaging first end surface 34, a member-engaging second end surface 36, and an elongated main body portion 38 between the end surfaces 34 and 36. The locking member 22 also includes projecting inner and outer pivots 40 and 42, respectively which extend laterally from the main body portion 38 for enabling pivotal motion of the locking member 22 about a pivot axis 44 of the locking member 22 which intersects the pivots 40 and 42. The end surfaces 34 and 36 of the locking member 22 are movable between engaged and disengaged positions with respect to the coupling members during the pivotal motion whereby one-way torque transfer may occur between the coupling members in the engaged positions of the locking members 22.

In general, the pivots 40 and 42 are sized, shaped and located with respect to the main body portion 38 to allow frictional engagement of an end surface 45 of the outer pivot 42 with an outer wall 46 of the pocket 32 to occur near the pivot axis 44 during rotation of the first coupling member 24 and the retained locking member 22 above a predetermined RPM, thereby significantly reducing overall moment on the locking member 22 about the pivot axis 44 that has to be overcome to move the locking member 22 between its engaged and disengaged positions.

The assembly also includes an aperture retainer element or plate supported between the first and second clutch members respectively. The retainer element has at least one element completely therethrough to allow the locking members or struts 22 to extend therethrough and lock the first and second clutch members together. The upper surfaces of the pivots 40 and 42 pivot against the lower surface of the retainer plate during such movement.

The overall or net moment on the locking member 22 is negative during pivotal moment of the locking member 22 from the disengaged position to the engaged position.

The overall or net moment on the locking member 22 is positive during pivotal motion of the locking member 22 from the engaged position to the disengaged position.

The inner pivot 40 is notched as indicated at 48, to allow frictional engagement of a side surface of the notched inner pivot 40 with an inner wall 52 of the pocket 32 and to prevent rotation of the locking member 22 in the pocket 32. The outer pivot 42 may also be notched in like fashion so that the locking member 22 can be used as either a forward locking member or a reverse locking member.

Center of gravity (i.e., C.G.) of the locking member 22 is located within the main body portion 38 and spaced away from the pivot axis 44.

Friction is the force that opposes the relative motion or tendency of such motion of two surfaces in contact. The coefficient of friction (also known as the frictional coefficient) is a dimensionless scalar value which described the ratio of the force of friction between two bodies and the force pressing them together.

SUMMARY OF EXAMPLE EMBODIMENTS

An object of at least one embodiment of the present inventions is to provide an overrunning coupling and control assembly, coupling assembly and locking member for use therein having improved dynamics with regards to locking member laydown speed.

In carrying out the above object and other objects of at least one embodiment of the present invention, a locking member for controllably transmitting torque between first and second coupling members of a coupling assembly is provided. The first coupling member includes a coupling face having a pocket which is at least partially defined by a pocket surface. The pocket is sized and shaped to receive and nominally retain the locking member. The locking member lays down in the pocket during an overrunning condition of the assembly at a laydown angular velocity of the first coupling member about a rotational axis of the assembly. The locking member includes at least one side surface which slidably contacts the pocket surface during locking member laydown. The locking member also includes a member-engaging first end surface, a member-engaging second end surface, and an elongated main body portion between the end surfaces. The locking member further includes at least one projecting pivot which extends laterally from the main body portion for enabling pivotal motion of the locking member during locking member laydown. The end surfaces of the locking member are movable between engaged and disengaged positions with respect to the coupling members during the pivotal motion whereby one-way torque transfer may occur between the coupling members. The at least one side surface has a draft with a draft angle to improve locking member dynamics with regards to locking member laydown speed and to minimize laydown speed variation caused by a variable frictional coefficient between the pocket surface and the at least one side surface.

The locking member may be a locking strut.

The locking strut may be a passive locking strut and the draft angle may be in a range of 0.0° to 30°.

The locking strut may be an active locking strut and the draft angle may be in a range of 5° to 30°.

The main body portion may have front and rear side surfaces having drafts and the drafts of the front and rear side surfaces are the inverse of one another.

The at least one pivot may include a side surface having the draft.

The locking member may include inner and outer pivots which extend laterally from the main body portion.

Further in carrying out the above object and other objects of at least one embodiment of the present invention, an engageable coupling assembly is provided. The assembly includes first and second coupling members. The first coupling member includes a coupling face having a pocket which is at least partially defined by a pocket surface. The pocket is sized and shaped to receive and nominally retain a locking member. The locking member lays down in the pocket during an overrunning condition of the assembly at a laydown angular velocity of the first coupling member about a rotational axis of the assembly. The locking member includes at least one side surface which slidably contacts the pocket surface during locking member laydown. The locking member also includes a member-engaging first end surface, a member-engaging second end surface, and an elongated main body portion between the end surfaces. The locking member further includes at least one projecting pivot which extends laterally from the main body portion for enabling pivotal motion of the locking member during locking member laydown. The end surfaces of the locking member are movable between engaged and disengaged positions with respect to the coupling members during the pivotal motion whereby one-way torque transfer may occur between the coupling members. The at least one side surface has a draft with a draft angle to improve locking member dynamics with regards to locking member laydown speed and to minimize laydown speed variation caused by a variable frictional coefficient between the pocket surface and the at least one side surface.

The locking member may be a locking strut such as a passive locking strut. The draft angle may be in a range of 0.0° to 30°.

The locking strut may be an active locking strut and the draft angle may be in a range of 5° to 30°.

The main body portion may have front and rear side surfaces having drafts and the drafts of the front and rear side surfaces are the inverse of one another.

The at least one pivot may include a side surface having a draft angle.

The locking member may include inner and outer pivots which extend laterally from the main body portion.

Still further in carrying out the above object and other objects of at least one embodiment of the present invention, an overrunning coupling and control assembly is provided. The assembly includes first and second coupling members. The first coupling member includes a coupling face having a pocket which is at least partially defined by a pocket surface. The pocket is sized and shaped to receive and nominally retain a locking member. The first coupling member also includes a second coupling face having a passage in communication with the pocket to communicate an actuating force to the locking member to actuate the locking member within the pocket so that the locking member moved between engaged and disengaged positions. The locking member lays down in the pocket during an overrunning condition of the assembly at a laydown angular velocity of the first coupling member about a rotational axis of the assembly. The locking member includes at least one side surface which slidably contacts the pocket surface during locking member laydown. The locking member also includes a member-engaging first end surface, a member-engaging second end surface, and an elongated main body portion between the end surfaces. The locking member further includes at least one projecting pivot which extends laterally from the main body portion for enabling pivotal motion of the locking member during locking member laydown. The end surfaces of the locking member are movable between engaged and disengaged positions with respect to the coupling members during the pivotal motion whereby one-way torque transfer may occur between the coupling members. The at least one side surface has a draft with a draft angle to improve locking member dynamics with regards to locking member laydown speed and to minimize laydown speed variation caused by a variable frictional coefficient between the pocket surface and the at least one side surface.

The locking member may be a locking strut such as a passive locking strut. The draft angle may be in a range of 0.0° to 30°.

The locking strut may be an active locking strut and the draft angle may be in a range of 5° to 30°.

The main body portion may be front and rear side surfaces having drafts and the drafts of the front and rear side surfaces may be the inverse of one another.

The at least one pivot may include a side surface having the draft.

The locking member may include inner and outer pivots which extend laterally from the main body portion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, two different locking members or struts are disclosed herein which can be used in their respective coupling assemblies and coupling and control assemblies. The first locking member 102 is specifically shown in drawing FIGS. 11-15 and the second locking member 202 is specifically shown in drawing FIGS. 16-19.

Figure 1:
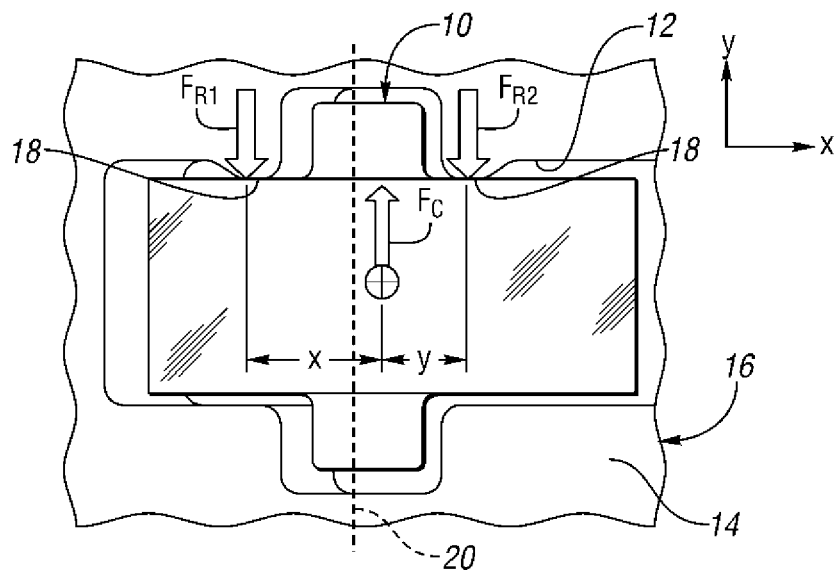
FIG. 1 is a top plan view, partially broken away, of a prior art locking member or strut located in a pocket of a rotating pocket plate together with a pivot axis of the strut, different reactive forces, $F_{R1}$ and $F_{R2}$, and a centrifugal force $F_{CG}$ at a center of gravity of the strut.
Figure 2:
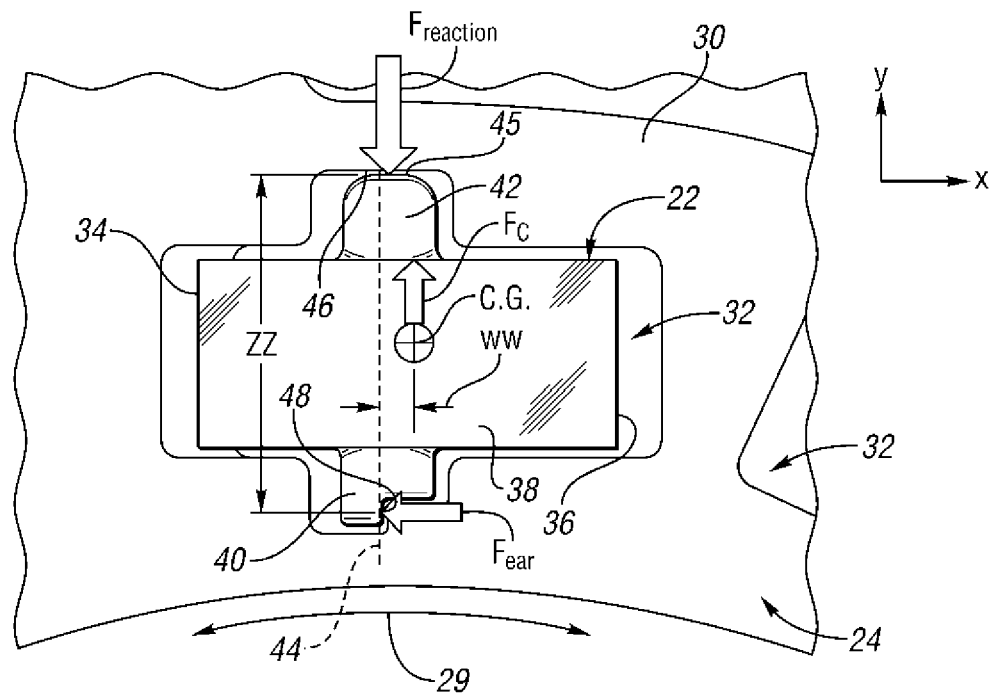
FIG. 2 is a view similar to the view of FIG. 1 of a different prior art locking member and different moment arms.
Figure 3:
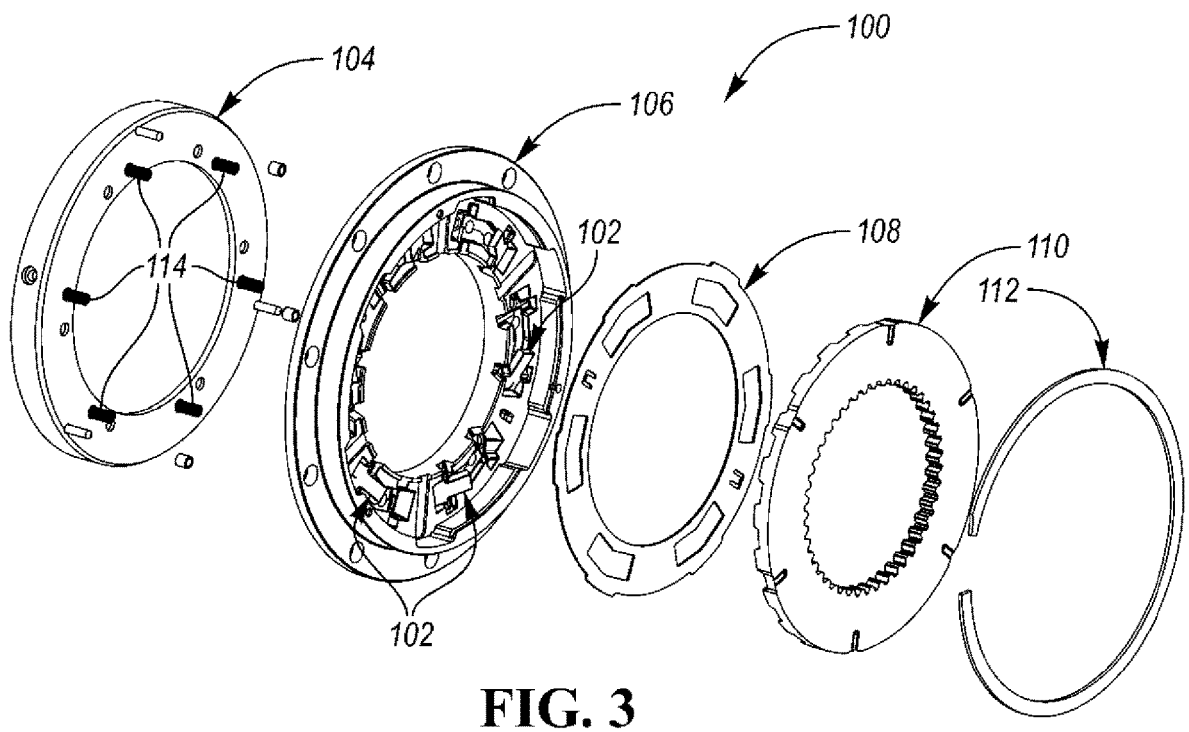
FIG. 3 is an exploded perspective view of a first embodiment of a passive coupling assembly constructed in accordance with the invention.
Figure 4:
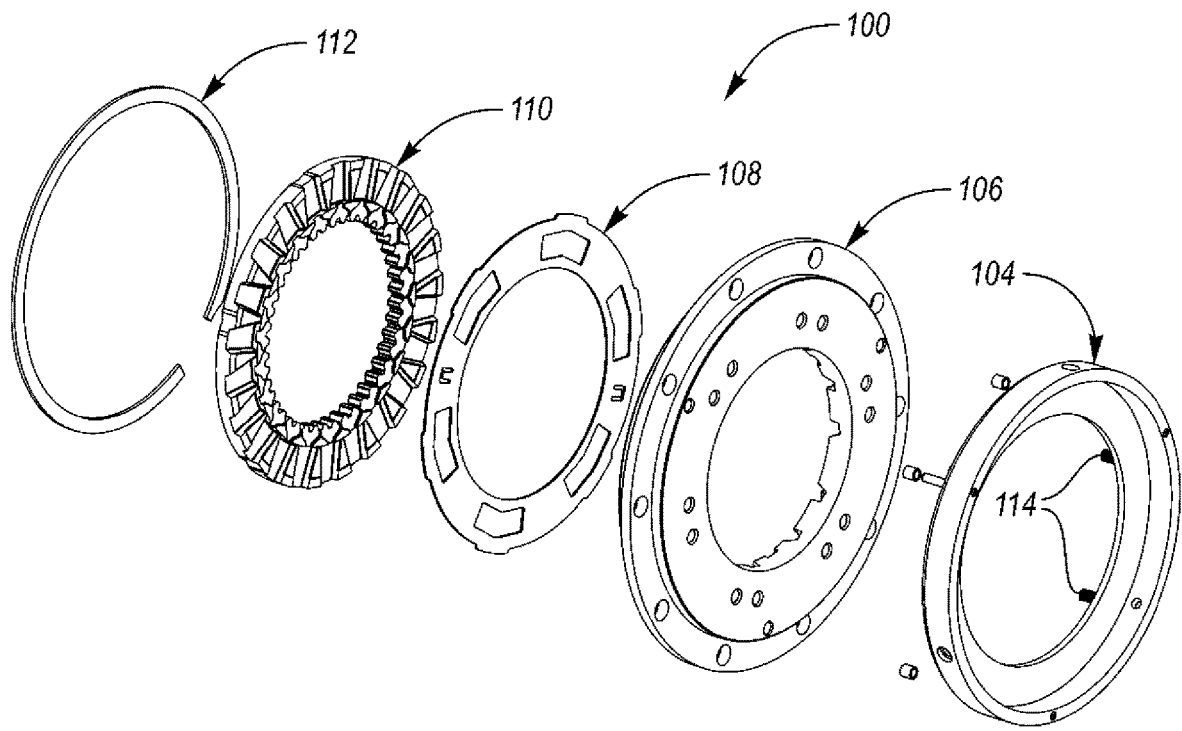
FIG. 4 is a view similar to the view of FIG. 3 but from a reverse angle.

A passive coupling assembly 100 including the first locking member 102 is shown in FIGS. 3 and 4 and a passive coupling assembly 200 including the second locking member 202 is shown in FIGS. 5, 6 and 20-23.

Figure 7:
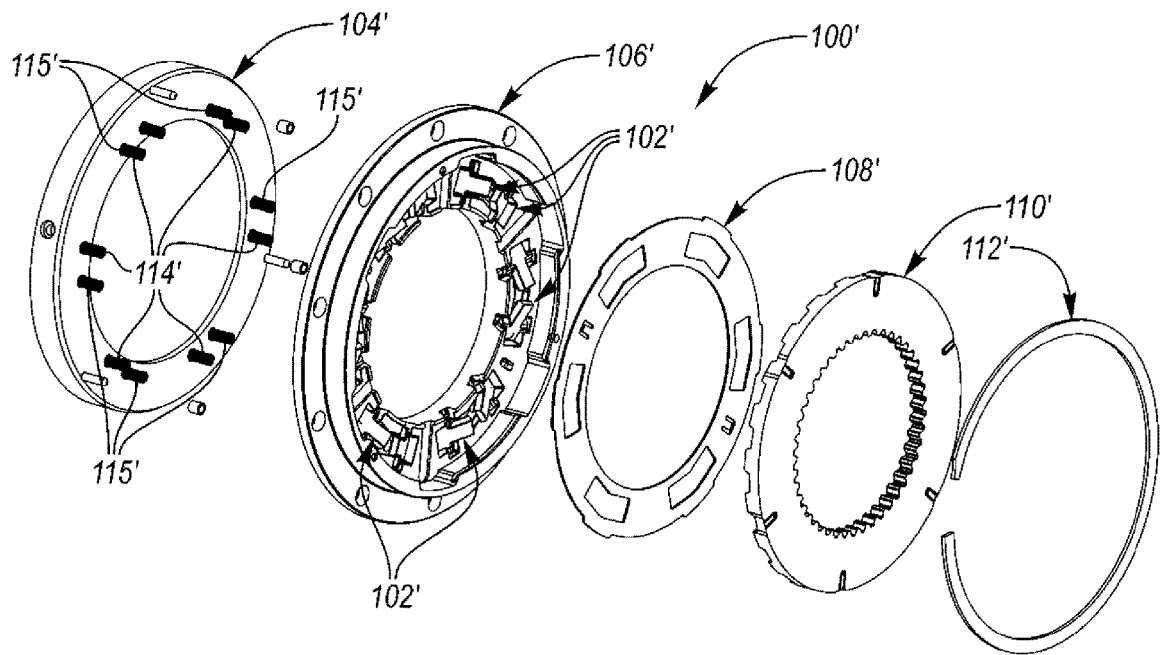
FIG. 7 is a view similar to the view of FIG. 3 of a first embodiment of an active coupling assembly constructed in accordance with the invention.
Figure 8:
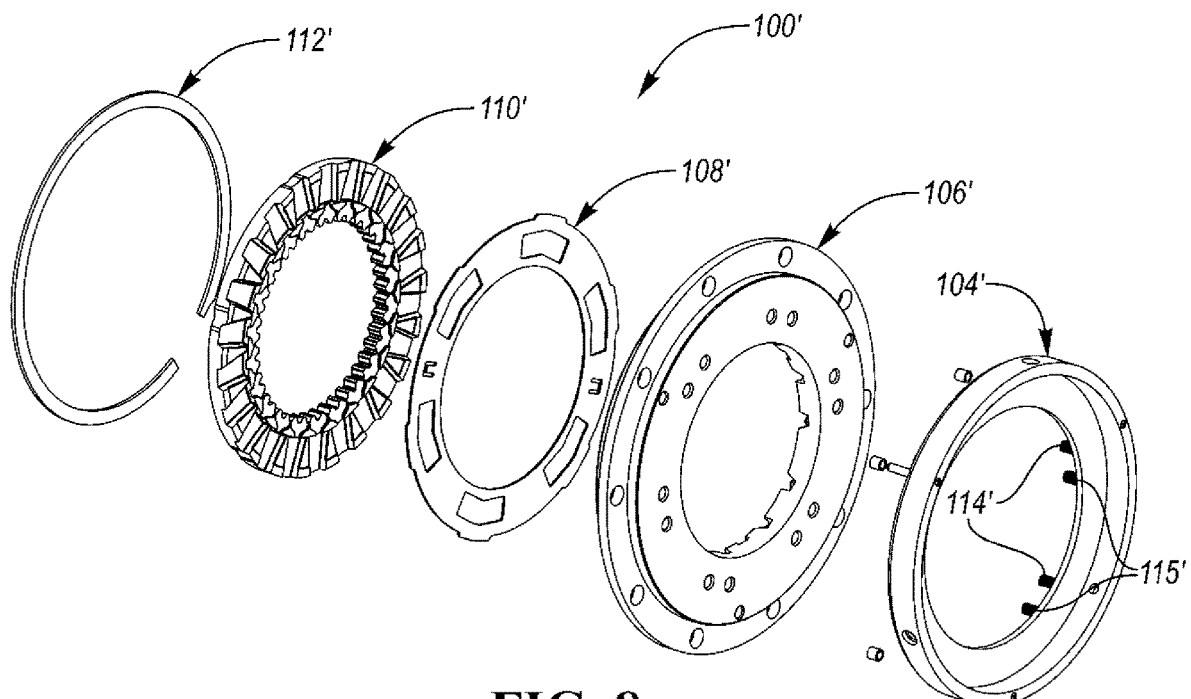
FIG. 8 is a view similar to the view of FIG. 7 but from a reverse angle.

An active coupling and control assembly 100' using the first locking member 102 is shown in FIGS. 7 and 8 and an active coupling and control assembly 200' including the second locking member 202 is shown in FIGS. 9, 10 and 25-31.

Locking members or struts of the two embodiments have two functions or features. The first function is when there is an actively controlled strut with a dynamic clutch where the active strut is rotating with the pocket plate. The strut is actuated to move into the up position so that a lock could occur between the pocket plate and notch plate. When the actuation system is commanded so the strut can disengage itself, the centrifugal force generated by the rotating strut can hold itself into the pocket plate and prevent a disengagement from occurring due to friction. To overcome this issue, a return spring with more force can be used. In one embodiment of the invention, the strut can be disengaged with either a small return spring or no return spring depending on how the strut needs to behave at lower speeds. A strut similar to this can allow for a clutch design to exist that does not use any springs; e.g. a dynamic clutch that only needs to engage at speeds higher than, for example, 500 rpm.

The second function is for a non-controlled strut, also known as a passive strut. Certain one way clutches are designed so that the struts will "laydown" at a given speed (usually the lower the "laydown" speed the better). This speed is determined by pocket geometry, strut geometry, strut pitch diameter, spring force, and the frictional coefficient.

Another embodiment of the invention uses new geometry so that the struts will "laydown" at lower speeds, much lower than prior designs. Since the struts will "laydown" at low speeds, the oil supplied to the clutch can be lower. Currently oil is supplied to one way clutches to assist strut stability, help with strut "laydown", and prevent rust and fretting. Using this embodiment, oils only purpose would be for rust and fretting prevention. Less oil in the system means lower drag and smaller pumps needed to pump the oil throughout the transmission.

The main difference in terms of calculations between these embodiments is the impact of friction. For an active strut, friction is detrimental and for a passive strut, friction is beneficial. This means that the pocket draft needs to be greater for an active strut than that of a passive strut. This is because an active strut is in the lock position and needs to return to the down position, but a passive strut gets pushed down into the pocket from the notch plate and need to stay down (so one needs to force the active strut into the pocket and keep the passive strut from coming out of the pocket). All other aspects of the embodiments between and active and passive strut can be the same.

In the first embodiment, the locking member or strut 102 (i.e. FIGS. 11-15) is a double drafted strut. The front side surfaces 120 of the strut 102 have a certain draft, and the back side surfaces 121 of the strut 102 have the inverse of the front draft. In this way the strut 102 can be used as either a forward or a reverse strut. These drafts are matched (are the inverse) with the pocket so that the strut side walls and the pocket side walls lineup to each other when the strut 102 is in the down (into pocket) position. The center of gravity does not need to be tightly controlled on this strut 102. The strut's "laydown" characteristics are dependent of the clutch diameter, clutch speed, strut mass, and draft angle and therefore can be altered to fit the application at hand.

In the second embodiment, the locking member or strut 202 (i.e. FIGS. 16-19) has large drafted ears 228 with side surfaces 220 that contact the pocket side walls. In like fashion, the strut 202 can be used as either a forward or a reverse strut. The draft on the strut ear side walls 220 is the inverse of the draft on the pocket ear (i.e. side walls) so that they line up together when the strut 202 is in the down position. This pocket and strut are easier to manufacture than the first embodiment. The center of gravity for this strut 202 needs to be in the ear portion of the pocket so that the strut 202 will not lose contact with the ear in the pocket plate 206. The strut's "laydown" characteristics are dependent of the clutch diameter, clutch speed, strut mass, and draft angle and therefore can be altered to fit the application at hand. The only trade off between the first and second embodiments is that the centrifugal force acting on the strut 202 of the second embodiment causes the strut 202 to want to push away the notch plate 210 more so than the first embodiment. To counteract this force an optional cover plate 208 (as shown in FIGS. 20-23) can be used to hold the strut 202 in the pocket. The cover plate 208 would look and act similar to a stationary selector plate.

The cover plate 208 prevents the strut 202 from pushing on the notch plate 210 when the strut 202 is laying down. The strut 202 allows for strut laydown to occur at a low RPM and with lower variance than the prior art (i.e. see graphs of FIG. 24). Typically, the lower the laydown speed the better for the passive strut 202. However, when a passive strut needs to engage in a dynamic situation (where both plates 206 and 210 are rotating) the strut 202 is beneficial.

Figure 20:
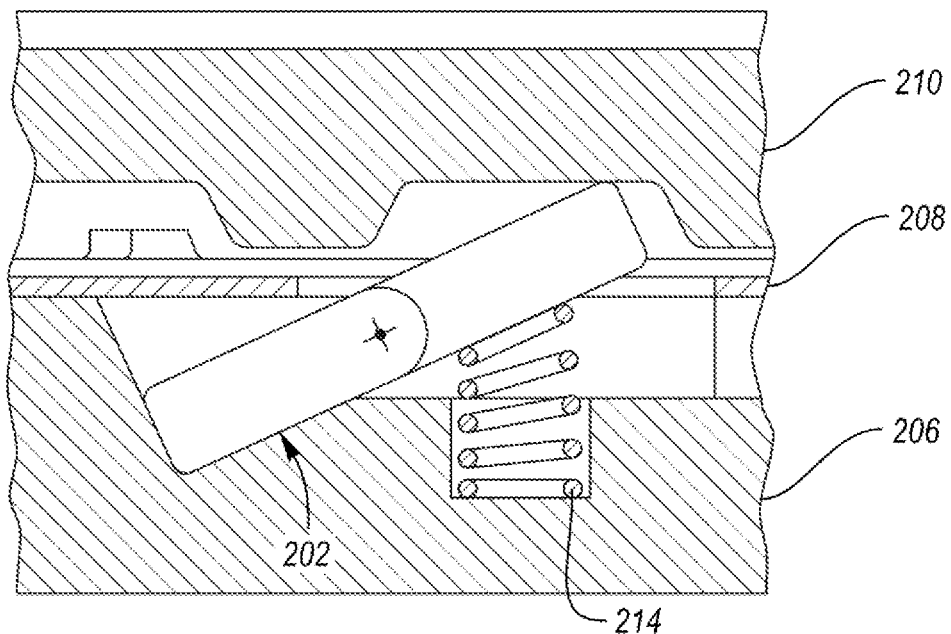
FIG. 20 is a view, partially broken away and in cross section, of a passive coupling assembly with the locking member of FIG. 16 extending through an aperture of a cover plate between pocket and notch plates.
Figure 21:
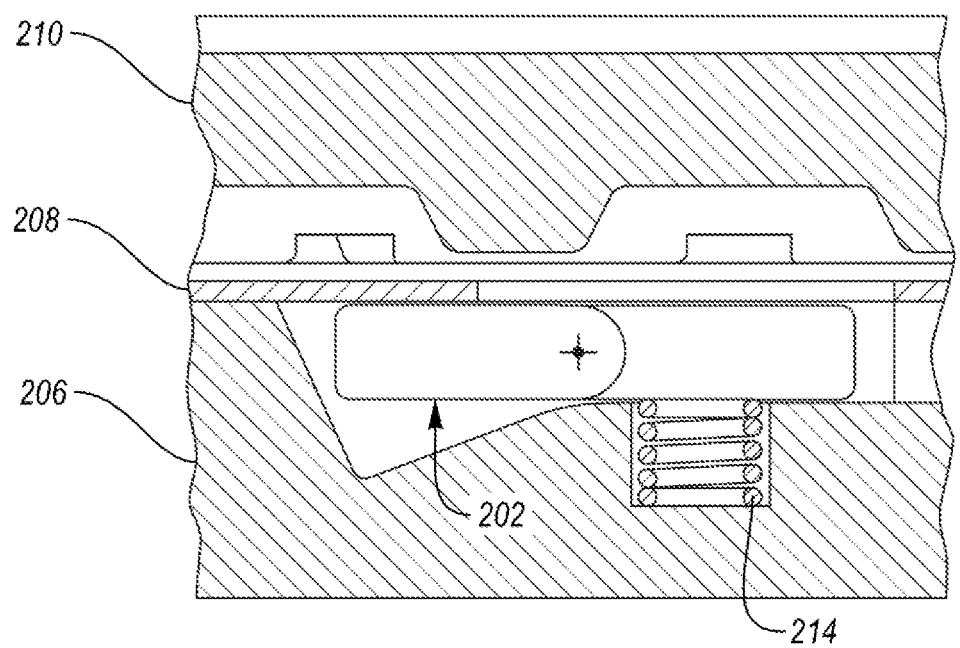
FIG. 21 is a view similar to the view of FIG. 20 but with the locking member in its laid down position.
Figure 22:
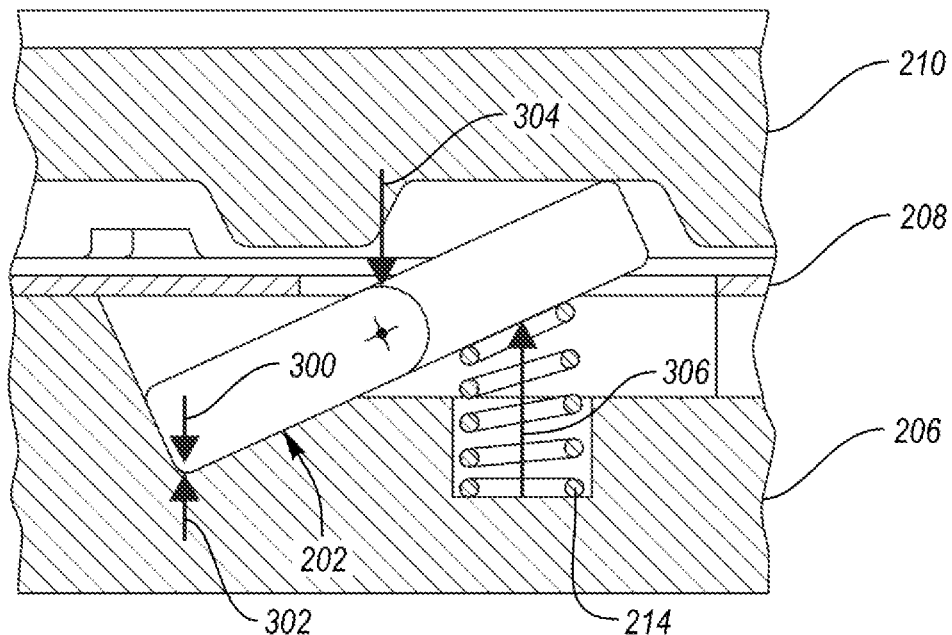
FIG. 22 is a view similar to the view of FIG. 20 but including arrows which represent various forces.
Figure 23:
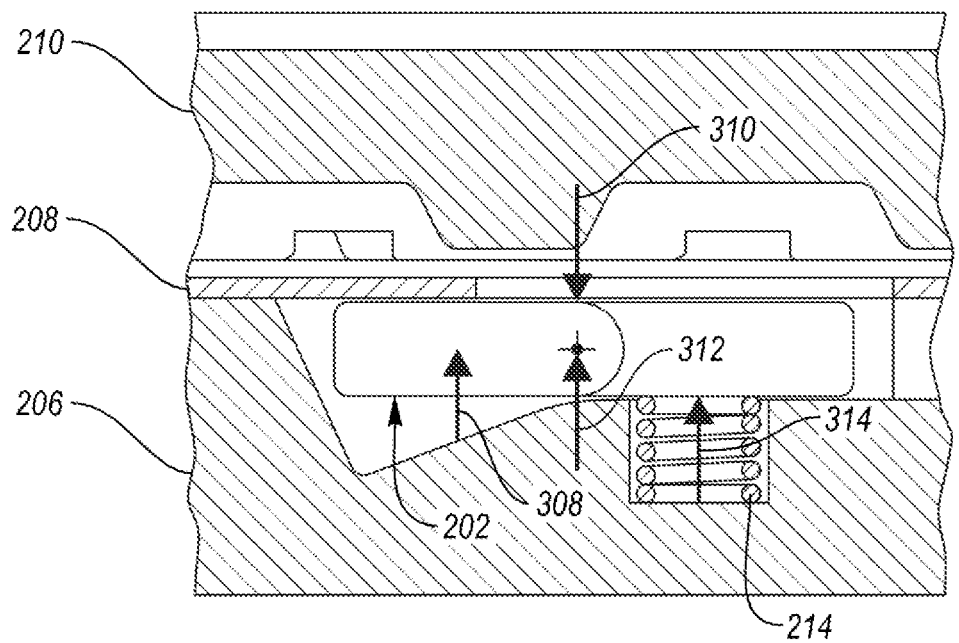
FIG. 23 is a view similar to the view of FIG. 21 but including arrows which represent various forces.

FIGS. 22 and 23 are similar to FIGS. 20 and 21, respectively, but include different arrows which represent forces. Arrow 300 is a frictional force, arrow 302 is a sliding force from centrifugal forces (contact moves up to this point when the strut 202 pitches up), arrow 304 is the cover plate force and arrow 306 is the spring force. In FIG. 23, arrow 308 is a frictional force, arrow 310 is a cover plate force and arrow 312 is the sliding force from centrifugal forces and arrow 314 is the spring force.

As shown in FIGS. 25-29, a controlled or active rotating strut 202' is actuated to move into the up position so that a lock can occur between the pocket plate 206' and notch plate 210'. When an actuation system including plate 204' and springs 215' is commanded so the strut 202' can disengage itself, the centrifugal force generated by the rotating strut 202' can hold itself in the pocket plate 206' and prevent a disengagement from occurring due to friction. To overcome this issue, a return spring 214' with more force can be used. With at least one embodiment of the invention, the strut 214' can be disengaged with either a small return spring, or no return spring depending on how the strut 202' needs to behave at lower speeds.

Figure 30:
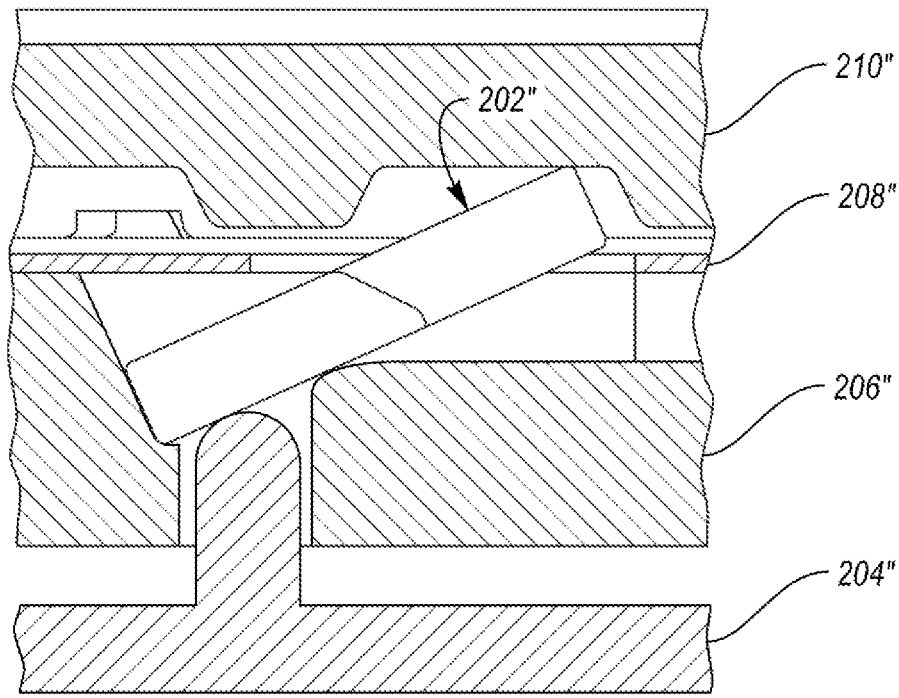
FIG. 30 is a view, partially broken away and in cross section, of a second embodiment of a coupling and control assembly without any springs.
Figure 31:
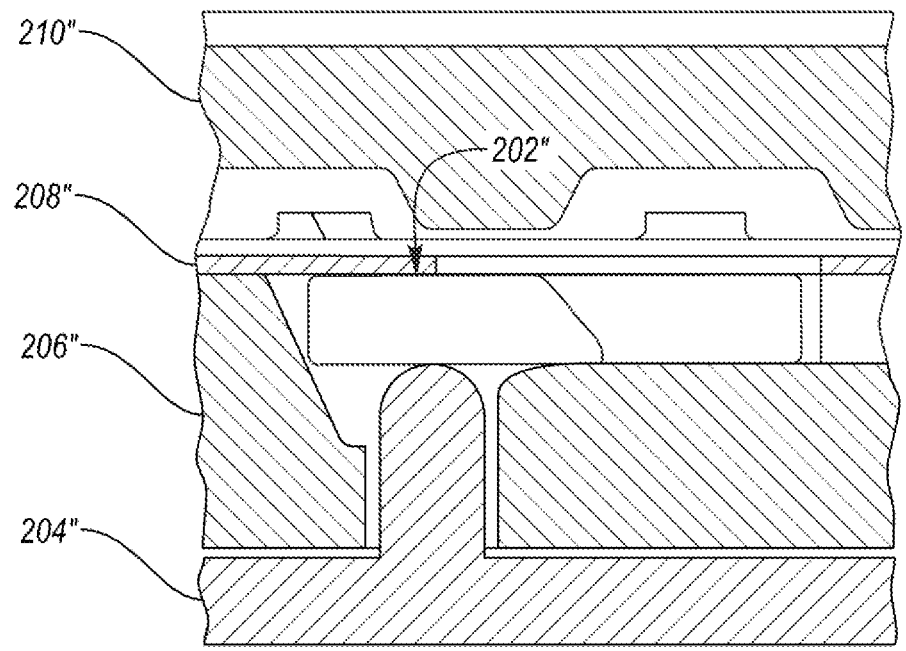
FIG. 31 is a view similar to the view of FIG. 30 with the locking member in its laydown position in its pocket.

A strut similar to this can allow for a clutch design to exist that does not use any springs (i.e. as shown in FIGS. 30 and 31); e.g. a dynamic clutch that only needs to engage at speeds higher than 500 rpm. This feature can be achieved with a strut 202" (i.e. FIGS. 30 and 31) that is opposite the strut 202' (i.e. the center of mass and main contact is at the body and not the rear). The embodiment of FIGS. 30 and 31 is similar to the embodiment of FIGS. 25-27. Consequently, the parts of the embodiment of FIGS. 30 and 31 have the same reference number but a double prime designation.

Figure 26:
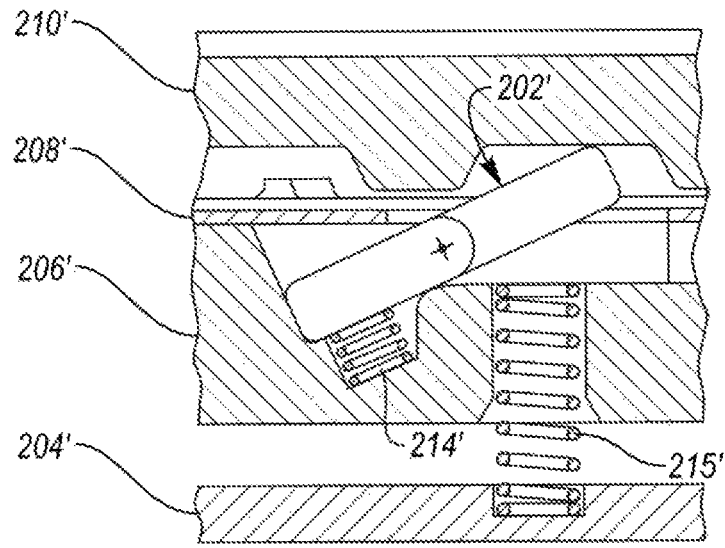
FIG. 26 is a view similar to the view of FIG. 25 but with an actuator of the assembly moved away from the locking member.
Figure 27:
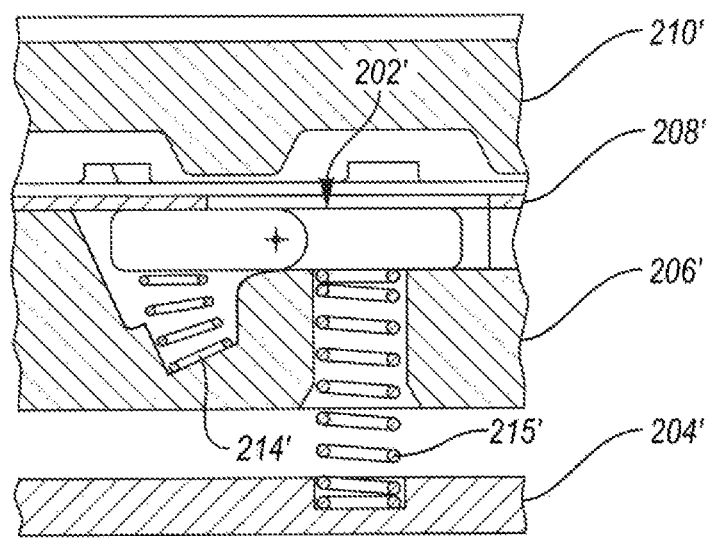
FIG. 27 is a view similar to the views of FIGS. 25 and 26 but with the locking member in its down position.
Figure 28:
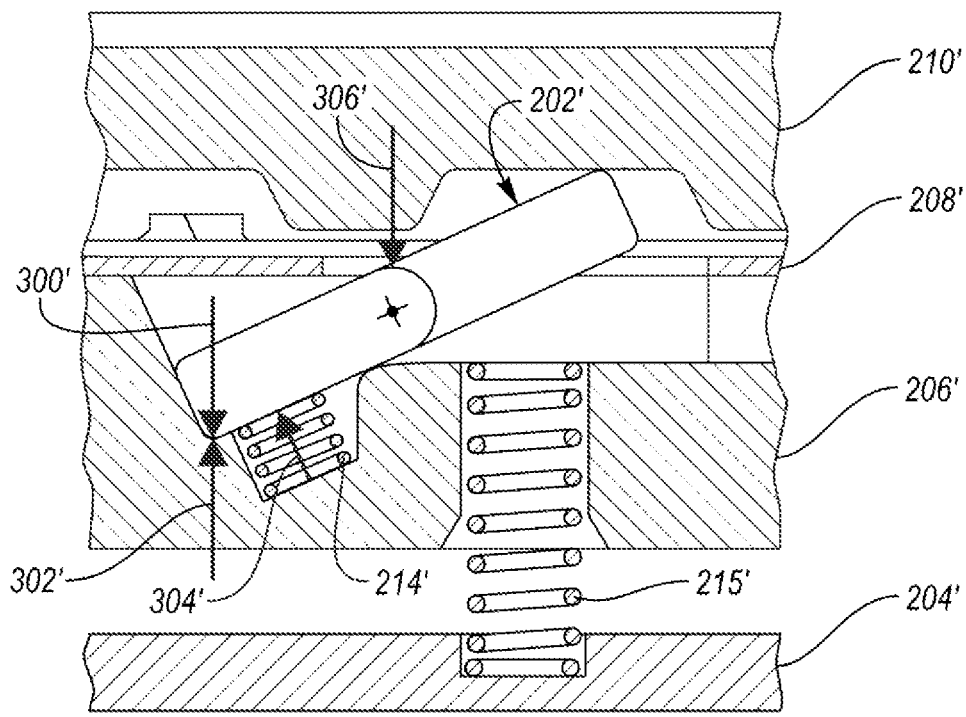
FIG. 28 is a view similar to the view of FIG. 26 but including force arrows.
Figure 29:
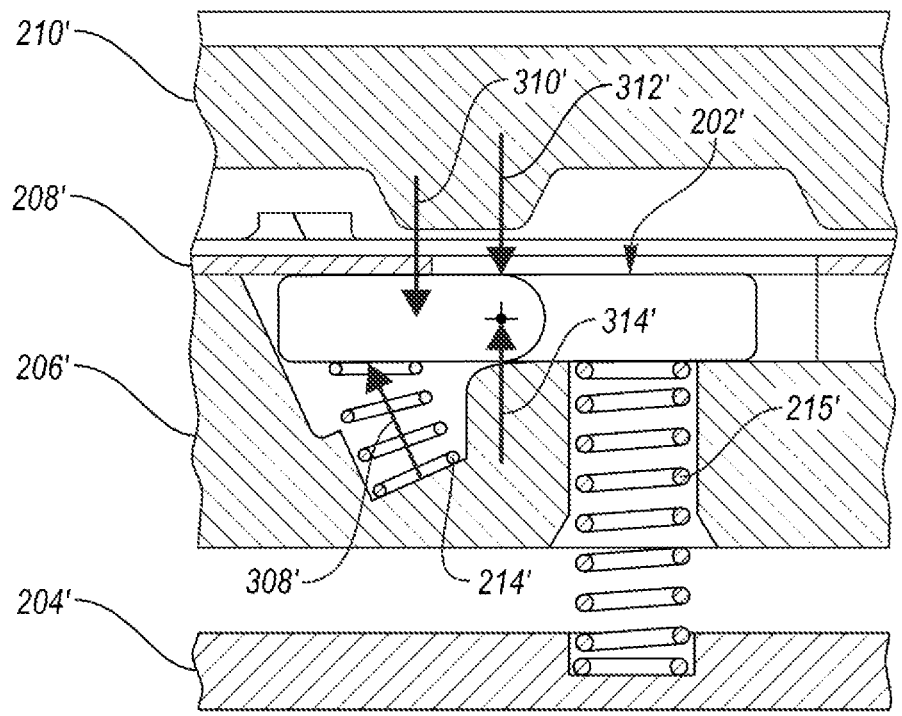
FIG. 29 is a view similar to the view of FIG. 27 but including force arrows.

FIGS. 28 and 29 are similar to FIGS. 26 and 27, respectively, but include arrows which represent forces. Arrow 300' is a frictional force, arrow 302' is a sliding force from centrifugal forces, arrow 304' is a spring force and arrow 306' is a cover plate force. In FIG. 29, arrow 308' is a spring force, arrow 310' is a frictional force, arrow 312' is a cover plate force and arrow 314' is a sliding force from centrifugal forces.

All one-way clutches have members that hold the load between two other members. Sprag clutches have sprags, roller clutches have cylindrical rollers, and mechanical diodes have struts. The durability during overrun of these clutch styles are usually limited by the sprag, roller, or strut members since they contact members that are rotating.

Figure 24:
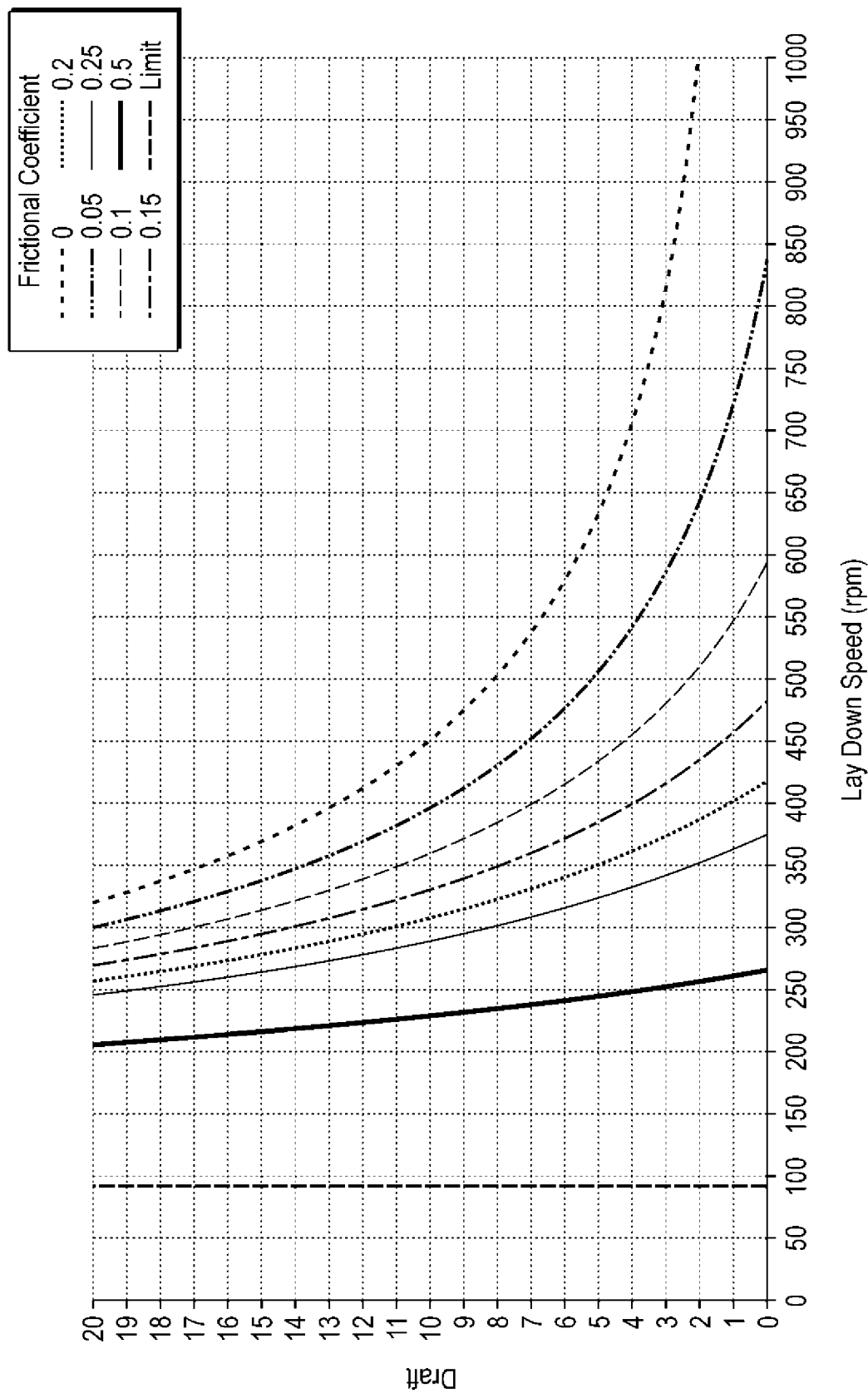
FIG. 24 is a graph of draft angle versus laydown speed (RPM) for a passive locking member with a variable frictional coefficient.
Figure 25:
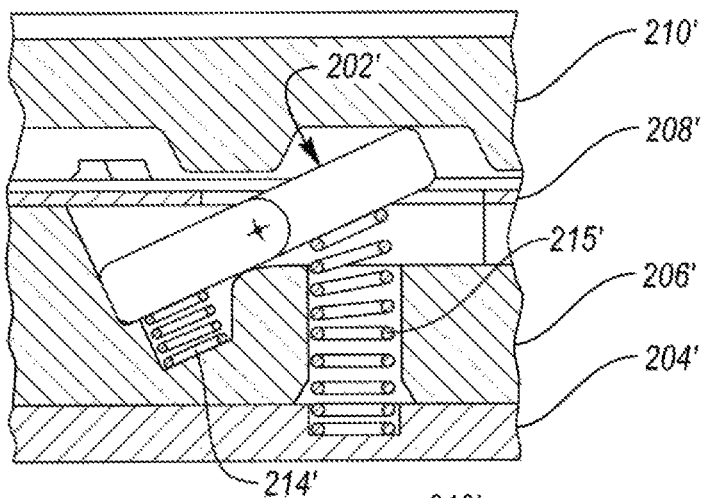
FIG. 25 is a view, partially broken away and in cross section, of a first embodiment of a coupling and control assembly of the present invention.

At least one embodiment of the invention allows for struts to "laydown" and get out of the way of rotating members at a fraction of the speeds previously design at. As an example, old methods have gotten the struts to "laydown" in a certain prior art one-way clutch around 1,800 rpm with large variation. At least one embodiment of the invention allows the strut in the same application to "laydown" around 400 rpm with little variation. With the traditional strut/pocket plate design, differences in the frictional coefficient causes large differences in the "laydown" speeds, and as shown in the graphs of FIG. 24 differences in the frictional coefficient causes little differences in "laydown" speed. This means that a clutch using locking members of at least one embodiment of the invention should see strut "laydown" speeds to be very similar when using less or no oil, much different than traditional designs.

FIGS. 3 and 4 show a passive coupling assembly, generally indicated at 100, which includes a plurality of the locking members or struts, generally indicated at 102 in FIGS. 11-15. The assembly 100 includes a backing phase, generally indicated at 104, a pocket plate, generally indicated at 106, an optional cover plate, generally indicated at 108, a notch plate, generally indicated at 110, and a snap ring, generally indicated at 112, which holds all of the plates 104, 106, 108 and 110 together. Biasing members or springs 114 bias their respective struts 102 within their respective pockets.

Figure 5:
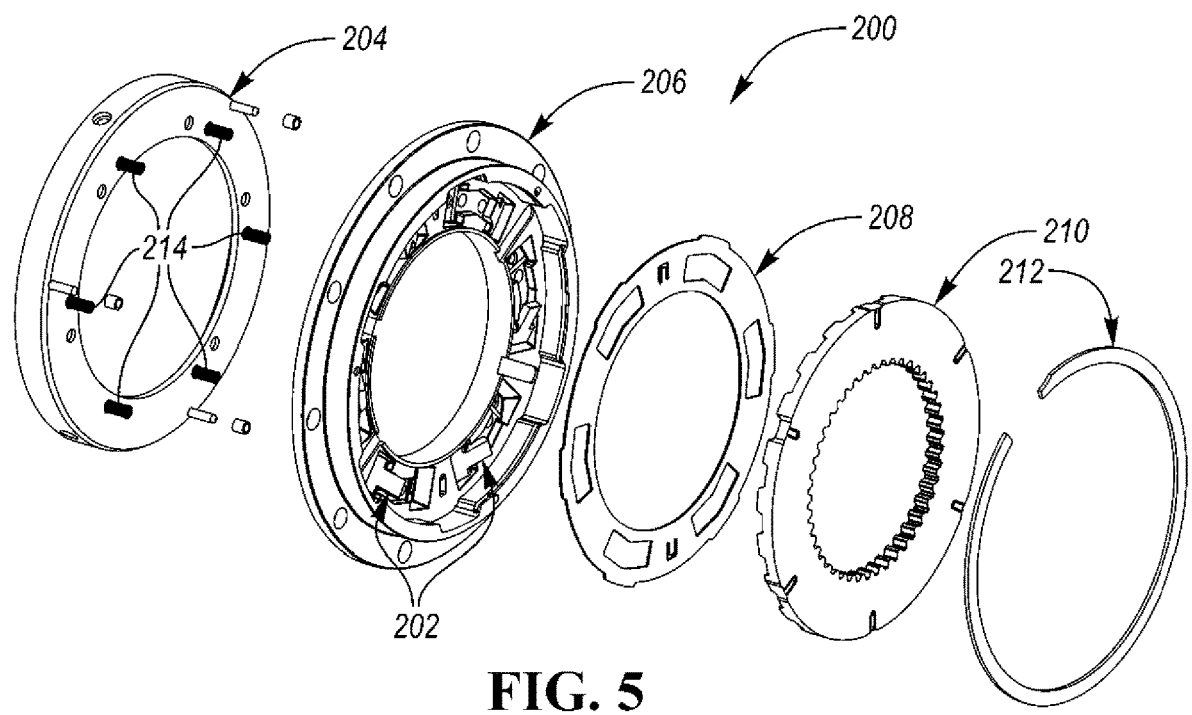
FIG. 5 is a view similar to the view of FIG. 3 showing a second embodiment of a passive coupling assembly.
Figure 6:
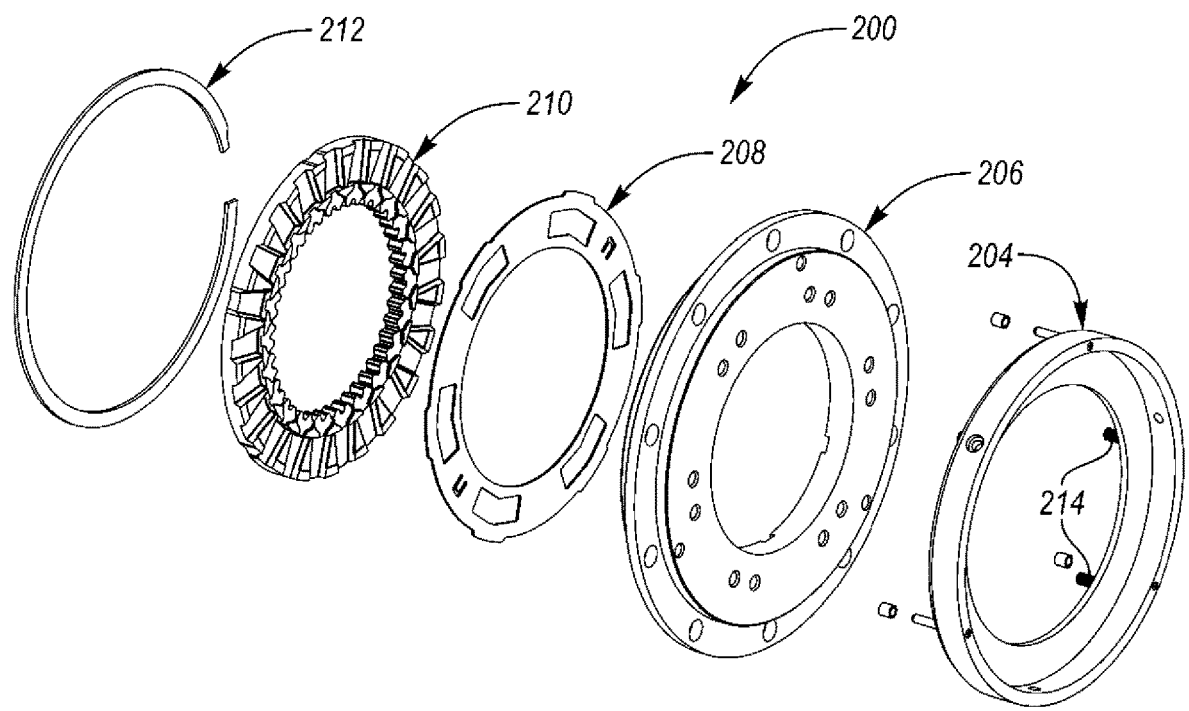
FIG. 6 is a view similar to the view of FIG. 5 but from a reverse angle.

In like fashion, FIGS. 5 and 6 show a passive coupling assembly, generally indicated at 200, which include the locking member or strut, generally indicated at 202, of FIGS. 16-19. The assembly 200 include a backing plate 204, a pocket plate 206, an optional cover plate 208, a notch plate 210 and a snap ring 212 which holds all the plates 204, 206, 208 and 210 together. Biasing members or springs 214 bias their respective struts 202 within their respective pockets. In general, a cover plate such as the cover plates 108, 208, 208' and 208" allows for a more robust and lower drag clutch but such a cover plate is optional.

FIGS. 7 and 8 show an active coupling and control assembly, generally indicated at 100'. The parts of the active assembly 100' which are the same or similar in either structure or function to the parts of the passive assembly 100 have the same reference number but a single prime designation. The assembly 100' further includes actuating biasing members or springs 115' mounted on the moveable backing plate 104' to actuate the respective struts 102' as best shown in FIGS. 25-29.

Figure 9:
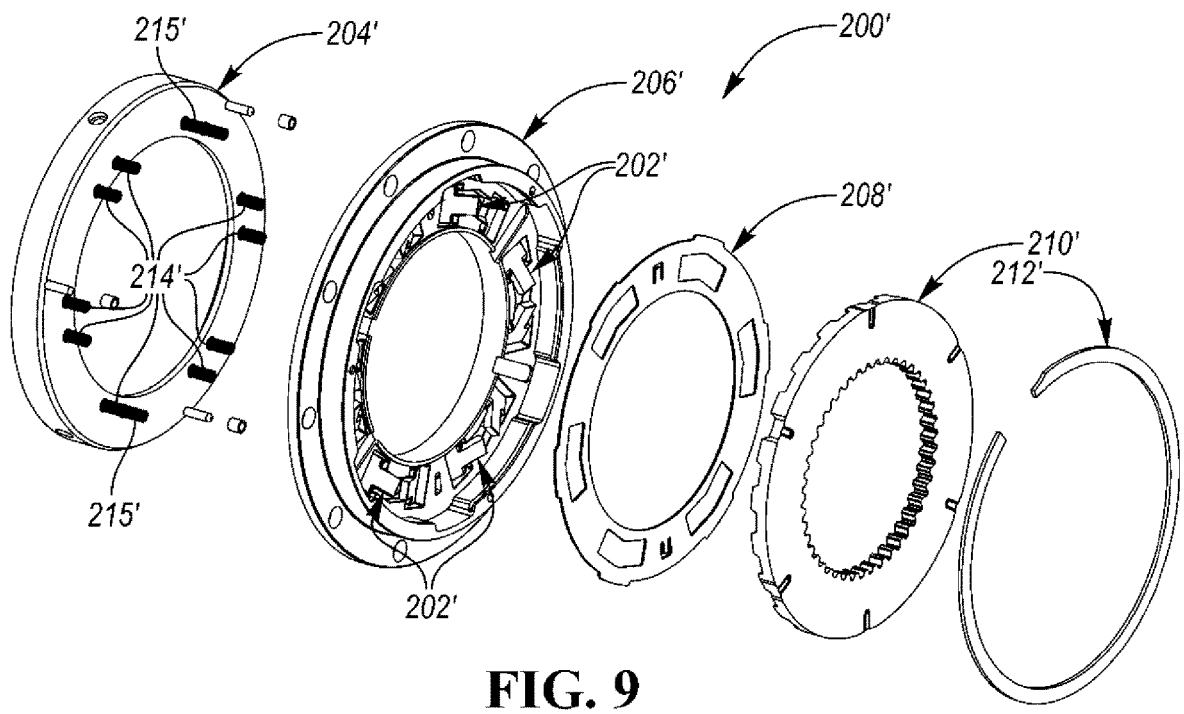
FIG. 9 is a view similar to the view of FIG. 5 showing a second embodiment of an active coupling assembly.
Figure 10:
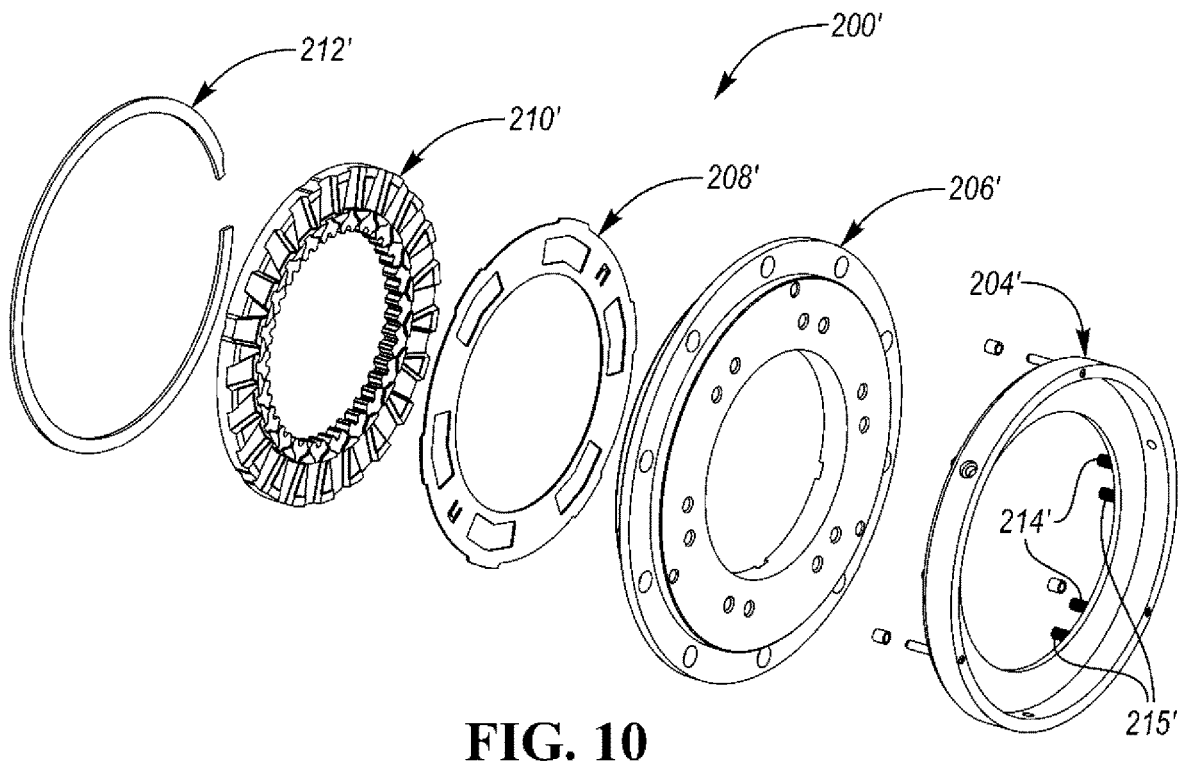
FIG. 10 is a view similar to the view of FIG. 9 but from a reverse angle.
Figure 11:
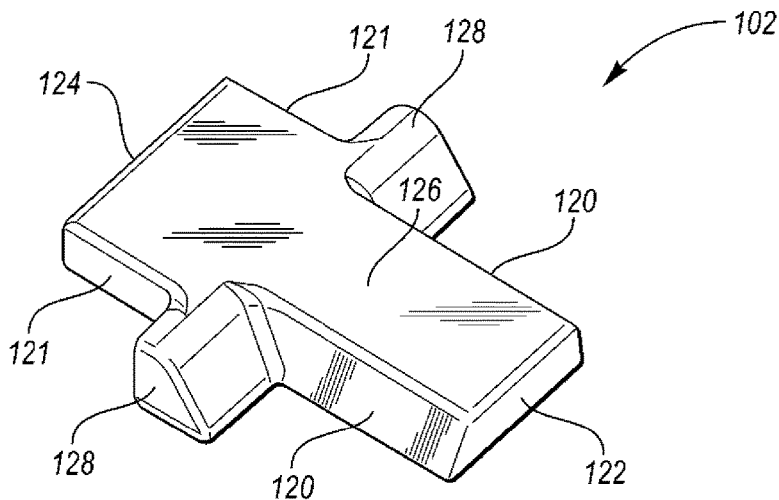
FIG. 11 is a top perspective view of a first embodiment of a locking member constructed in accordance with the present invention.
Figure 12:
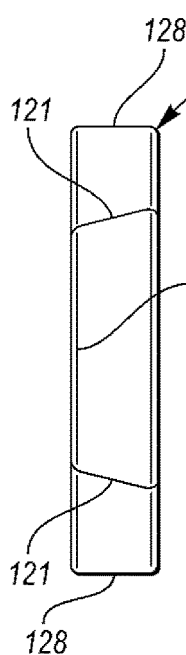
FIG. 12 is a back end view of the locking member of FIG. 11.
Figure 13:
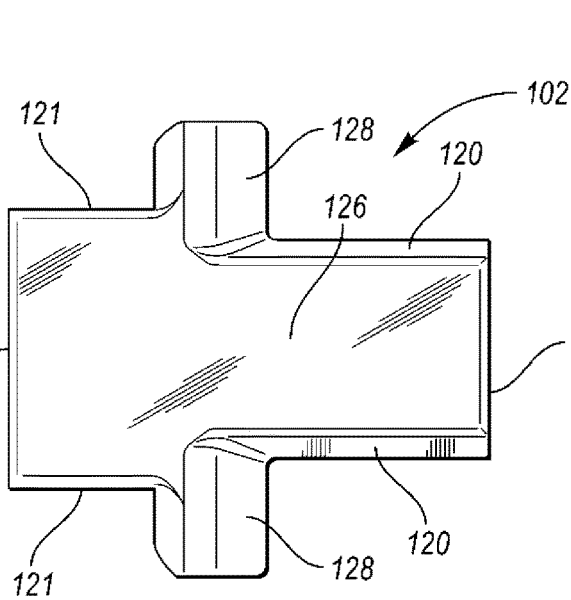
FIG. 13 is a top plan view of the locking member of FIG. 11.
Figure 14:
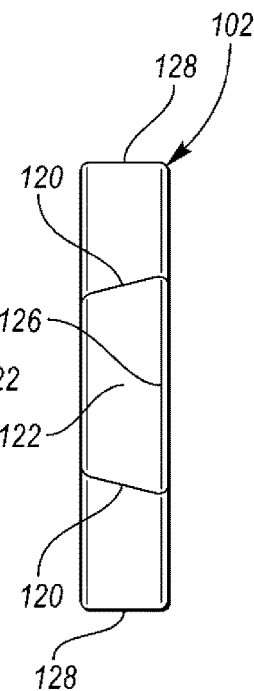
FIG. 14 is a front end view of the locking member of FIG. 11.
Figure 15:
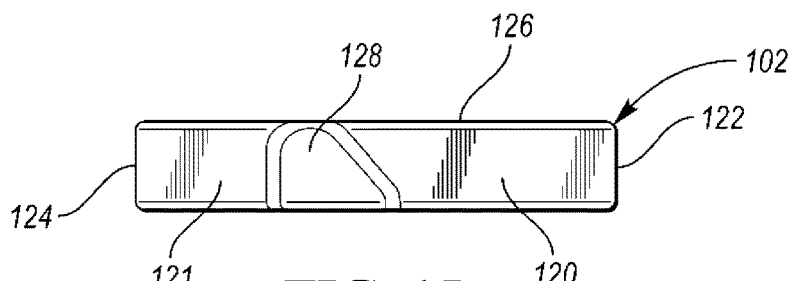
FIG. 15 is a side elevational view of the locking member of FIG. 11.
Figure 16:
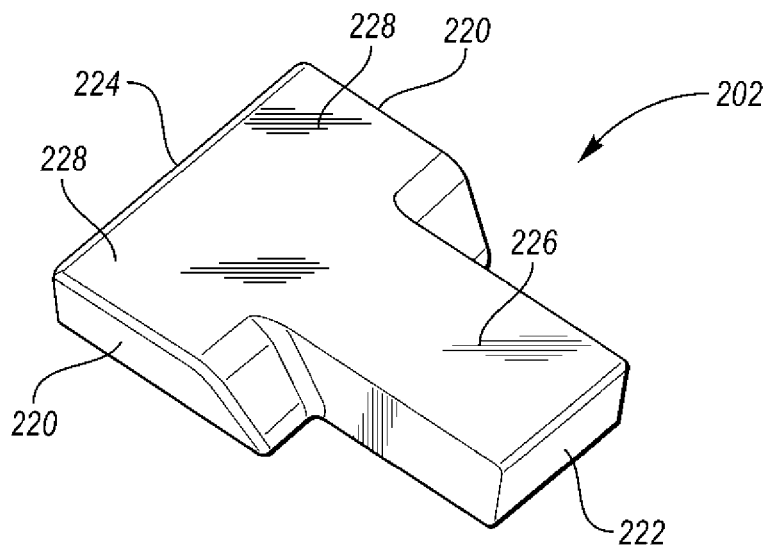
FIG. 16 is a view similar to the view of FIG. 11 but of a second embodiment of the locking member.
Figure 17:
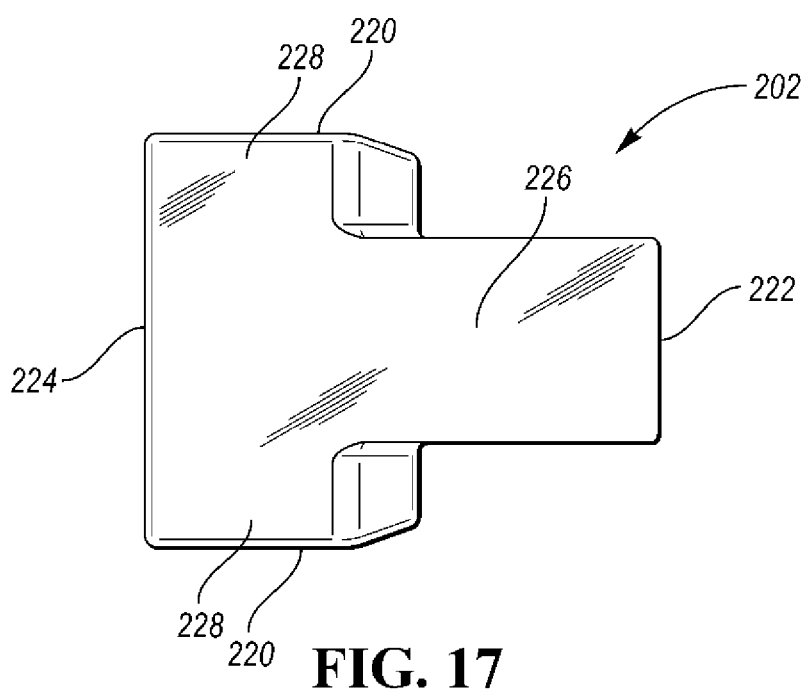
FIG. 17 is a view similar to the view of FIG. 13 but of the second embodiment.
Figure 18:
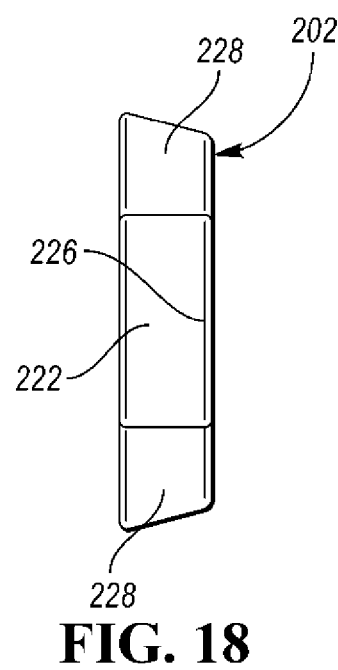
FIG. 18 is a view similar to the view of FIG. 14 but of the second embodiment.
Figure 19:
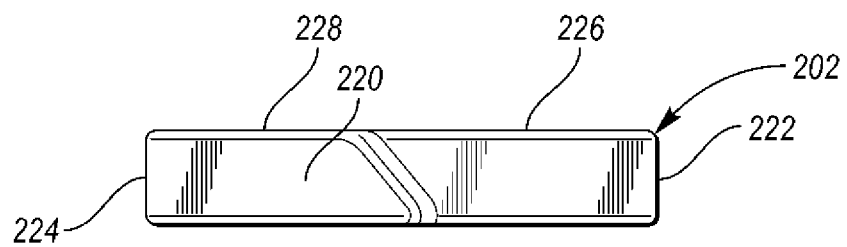
FIG. 19 is a view similar to the view of FIG. 15 but of the second embodiment.

FIGS. 9 and 10 show an active coupling and control assembly, generally indicated at 200'. The parts of the active assembly 200' which are the same or similar in either structure or function to the parts of the passive assembly 200 have the same reference number but a single prime designation. The assembly 200' further includes actuating biasing members or springs 215' mounted on the moveable backing plate 204' to actuate their respective struts 202'.

Referring again to FIGS. 11-15, the strut 102 has front and rear side surfaces 120 and 121, respectively, one pair of which slidably contacts a pocket side surface during locking member laydown. The strut 102 also includes a member-engaging first end surface 122, a member-engaging second end surface 124 and an elongated main body portion 126 between the end surfaces 122 and 124. At least one and preferably two (so that the strut can be used either as a forward or a reverse strut) projecting pivots or ears 128 extends laterally from the main body portion 126 for enabling pivotal motion of the locking member 102 during locking member laydown. The end surfaces 122 and 124 of the locking member 102 are moveable between engaged and disengaged positions with respect to the coupling members 106 and 110 during the pivotal motion whereby one-way torque transfer may occur between the coupling members 106 and 110. The side surfaces 120 and 121 have a draft with a draft angle to improve locking member dynamics with regards to locking member laydown speed and to minimize laydown speed variation caused by a variable frictional coefficient between the pocket side surfaces and the side surfaces 120 and 121 of the strut 102 as shown by the graphs of FIG. 24.

When used as a passive locking member or strut, the strut 102 has a draft angle which lies in a range of 0.0° to 30.0° and when used as an active locking member or strut, the strut 102 has a draft angle which lies in a range of 5° to 30°. The drafts of the front and rear side surface, 120 and 121, respectively, are preferably the inverse of one another.

Referring to FIGS. 16-19, the strut 202 has two side surfaces 220 (so that the strut can be used as either a forward or a reverse strut) one of which slidably contacts the pocket side surface during locking member laydown. The strut 202 also includes a member-engaging first end surface 222, a member-engaging second end surface 224 and an elongated main body portion 226 between the end surfaces 222 and 224. A pair of projecting pivots 228 extends laterally from the main body portion 226 for enabling pivotal motion of the locking member 202 during locking member laydown. The end surfaces 222 and 224 of the locking member 202 are moveable between engaged and disengaged positions with respect to the coupling members 206 and 210 during the pivotal motion whereby one-way torque transfer may occur between the coupling members 206 and 210. Each of the side surfaces 220 has a draft with a draft angle to improve locking member dynamics with regards to locking member laydown speed and to minimize laydown speed variation caused by a variable frictional coefficient between the pocket side surface and the side surface 220. As in the case of locking member 102, when used as a passive locking member the strut 202 has a draft angle which lies in a range of 0.0° to 30.0° and when used as an active strut, the strut 202 has a draft angle which lies in a range of 5° to 30°.

Each of the pockets in the pocket plates 106, 206, 106' and 206' provides sufficient clearance to allow sliding movement of its locking member during movement of the locking member between engaged and disengaged positions. Each locking member may be an injection molded locking member such as a metal injection molded locking member or part.

In the embodiments of FIGS. 7-10, the first coupling member or pocket plate also has a face having a plurality of passages spaced about the rotational axis of the assembly and including passages in communication with the pockets. The passages communicate actuating forces (typically via actuating springs) to their respective locking members within their respective pockets. The face and the opposite face are generally annular and extend generally radially with respect to the rotational axis of the assembly. Actuators, such as spring actuators, may be received within the passages to provide the actuating forces to actuate the locking members within their respective pockets so that the locking members move between their engaged and disengaged positions. Other types of actuators besides the spring actuators may be used to provide the actuating forces. Also, pressurized fluid may be used to provide the actuating forces. Biasing members such as coiled return springs bias the locking members against pivotal motion of the locking members towards their engaged positions. The spring actuators pivot their locking members against the bias of the spring biasing members. Each pocket has an inner recess for receiving its respective biasing spring wherein each pocket is a spring pocket.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A locking member for controllably transmitting torque between first and second coupling members of a coupling assembly, the first coupling member including a coupling face having a pocket which is at least partially defined by a pocket surface, the pocket being sized and shaped to receive and nominally retain the locking member, the locking member laying down in the pocket during an overrunning condition of the assembly at a laydown angular velocity of the first coupling member about a rotational axis of the assembly, the locking member comprising:
   a front side surface and a rear side surface which slidably contact the pocket surface during locking member laydown;
   a member-engaging first end surface;
   a member-engaging second end surface;
   an elongated main body portion between the end surfaces; and
   at least one projecting pivot which extends laterally from the main body portion for enabling pivotal motion of the locking member during locking member laydown, the end surfaces of the locking member being movable between engaged and disengaged positions with respect to the coupling members during the pivotal motion whereby one-way torque transfer may occur between the coupling members and wherein the front side surface has a first draft with a non-zero, first draft angle and the rear side surface has a second draft with a non-zero, second draft angle different than the first draft angle to improve locking member dynamics with regards to locking member laydown speed and to minimize laydown speed variation caused by a variable frictional coefficient between the pocket surface and the front and rear side surfaces.

2. The locking member as claimed in claim 1, wherein the locking member is a locking strut.

3. The locking member as claimed in claim 2, wherein the locking strut is a passive locking strut.

4. The locking member as claimed in claim 2, wherein the locking strut is an active locking strut.

5. The locking member as claimed in claim 1, wherein the first draft angle is a positive draft angle and the second draft angle is a negative draft angle.

6. The locking member as claimed in claim 5, wherein the locking member is a passive locking strut and the positive draft angle is greater than 0.0° and less than 30°.

7. The locking member as claimed in claim 5, wherein the locking member is an active locking strut and the positive draft angle is greater than 5° and less than 30°.

8. The locking member as claimed in claim 5, wherein the first draft and the second draft are the inverse of one another whereby a sum of the positive draft angle and the negative draft angle is 0.0°.

9. The locking member as claimed in claim 1, wherein the at least one projecting pivot includes inner and outer projecting pivots.

10. An engageable coupling assembly comprising:
    first and second coupling members, the first coupling member including a coupling face having a pocket which is at least partially defined by a pocket surface, the pocket being sized and shaped to receive and nominally retain a locking member, the locking member laying down in the pocket during an overrunning condition of the assembly at a laydown angular velocity of the first coupling member about a rotational axis of the assembly, the locking member including:
    a front side surface and a rear side surface which slidably contact the pocket surface during locking member laydown;
    a member-engaging first end surface;
    a member-engaging second end surface;
    an elongated main body portion between the end surfaces; and
    at least one projecting pivot which extends laterally from the main body portion for enabling pivotal motion of the locking member during locking member laydown, the end surfaces of the locking member being movable between engaged and disengaged positions with respect to the coupling members during the pivotal motion whereby one-way torque transfer may occur between the coupling members and wherein the front side surface has a first draft with a non-zero, first draft angle and the rear side surface has a second draft with a non-zero, second draft angle different than the first draft angle to improve locking member dynamics with regards to locking member laydown speed and to minimize laydown speed variation caused by a variable frictional coefficient between the pocket surface and the front and rear side surfaces.

11. The assembly as claimed in claim 10, wherein the locking member is a locking strut.

12. The assembly as claimed in claim 11, wherein the locking strut is a passive locking strut.

13. The assembly as claimed in claim 11, wherein the locking strut is an active locking strut.

14. The assembly as claimed in claim 10, wherein the first draft angle is a positive draft angle and the second draft angle is a negative draft angle.

15. The assembly as claimed in claim 14, wherein the locking member is a passive locking strut and the positive draft angle is greater than 0.0° and less than 30°.

16. The assembly as claimed in claim 14, wherein the locking member is an active locking strut and the positive draft angle is greater than 5° and less than 30°.

17. The assembly as claimed in claim 14, wherein the first draft and the second draft are the inverse of one another whereby a sum of the positive draft angle and the negative draft angle is 0.0°.

18. The assembly as claimed in claim 10, wherein the at least one projecting pivot includes inner and outer projecting pivots.

19. An overrunning coupling and control assembly comprising:
    first and second coupling members, the first coupling member including a first coupling face having a pocket which is at least partially defined by a pocket surface, the pocket being sized and shaped to receive and nominally retain a locking member and a second coupling face having a passage in communication with the pocket to communicate an actuating force to the locking member to actuate the locking member within the pocket so that the locking member moves between engaged and disengaged positions, the locking member laying down in the pocket during an overrunning condition of the assembly at a laydown angular velocity of the first coupling member about a rotational axis of the assembly, the locking member including:

a front side surface and a rear side surface which slidably contact the pocket surface during locking member laydown;

a member-engaging first end surface;

a member-engaging second end surface;

an elongated main body portion between the end surfaces; and at least one projecting pivot which extends laterally from the main body portion for enabling pivotal motion of the locking member during locking member laydown, the end surfaces of the locking member being movable between engaged and disengaged positions with respect to the coupling members during the pivotal motion whereby one-way torque transfer may occur between the coupling members and wherein the front side surface has a first draft with a non-zero, first draft angle and the rear side surface has a second draft with a non-zero, second draft angle different than the first draft angle to improve locking member dynamics with regards to locking member laydown speed and to minimize laydown speed variation caused by a variable frictional coefficient between the pocket surface and the front and rear side surfaces.

20. The assembly as claimed in claim 19, wherein the locking member is a locking strut.

21. The assembly as claimed in claim 20, wherein the locking strut is a passive locking strut.

22. The assembly as claimed in claim 20, wherein the locking strut is an active locking strut.

23. The assembly as claimed in claim 19, wherein the first draft angle is a positive draft angle and the second draft angle is a negative draft angle.

24. The assembly as claimed in claim 23, wherein the locking member is a passive locking strut and the positive draft angle is greater than 0.0° and less than 30°.

25. The assembly as claimed in claim 23, wherein the locking member is a passive locking strut and the positive draft angle is greater than 5° and less than 30°.

26. The assembly as claimed in claim 23, wherein the first draft and the second draft are the inverse of one another whereby a sum of the positive draft angle and the negative draft angle is 0.0°.

27. The assembly as claimed in claim 19, wherein the at least one projecting pivot includes inner and outer projecting pivots.

* * * * *